United States Patent
Cao et al.

(10) Patent No.: US 8,362,913 B2
(45) Date of Patent: Jan. 29, 2013

(54) POWER-SAVING REMINDER CIRCUIT FOR COMPUTER

(75) Inventors: Xiang Cao, Shenzhen (CN); Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 176 days.

(21) Appl. No.: 13/081,526

(22) Filed: Apr. 7, 2011

(65) Prior Publication Data

US 2012/0242494 A1    Sep. 27, 2012

(30) Foreign Application Priority Data

Mar. 23, 2011    (CN) .......................... 2011 1 0070687

(51) Int. Cl.
*G08B 3/00* (2006.01)

(52) U.S. Cl. ...................... 340/691.1; 361/42; 340/815.4
(58) Field of Classification Search ............... 340/691.1, 340/693.1, 693.3, 636.1, 636.12, 636.13, 340/641, 654, 653, 815.4, 500; 361/42, 88, 361/90, 79, 93.1
See application file for complete search history.

(56) References Cited

U.S. PATENT DOCUMENTS

| | | | | |
|---|---|---|---|---|
| 6,828,915 | B2 * | 12/2004 | Gottlieb | 340/653 |
| 7,439,874 | B2 * | 10/2008 | Sotiriou | 340/815.4 |
| 2005/0270169 | A1 * | 12/2005 | Drader et al. | 340/691.1 |

* cited by examiner

*Primary Examiner* — George Bugg
*Assistant Examiner* — Edny Labbees
(74) *Attorney, Agent, or Firm* — Altis Law Group, Inc.

(57) ABSTRACT

A power saving circuit for a computer. When the computer is powered on, an LED is lit. When the computer if off but power is still being supplied from the commercial power source to the power supply of the computer, the LED blinks. A counter chip determines the time to start blinking or the frequency of blinking.

10 Claims, 2 Drawing Sheets

POWER-SAVING REMINDER CIRCUIT FOR COMPUTER

BACKGROUND

1. Technical Field

The present disclosure relates to reminder circuits, and particularly to a power-saving reminder circuit to remind users to shut off commercial power after a computer is powered off or suspended.

2. Description of Related Art

In a personal computer (PC) system, power management is adopted to conserve energy. While the PC is powered, it can be put in a sleep mode to save energy when not in use. System power states derived from the advanced configuration and power interface (ACPI) specification are defined as follows:

S0/Working—The central processing unit (CPU) is fully up and operating; devices are powering up and down as needed.

S1—The CPU is stopped; the random access memory (RAM) is refreshed; the system is operating in a low power mode.

S2—The CPU has no power; the RAM is refreshed; the system is in a lower power mode than S1.

S3—The CPU has no power; the RAM is in slow refresh; the power supply is generally in a reduced power mode (for example, the power supply not supplying much power and is operating in a lower power efficiency mode).

S4—The hardware is completely off; the system memory has been saved to disk.

S5/Off—the hardware is completely off; the operating system has shut down; nothing has been saved.

When the computer is suspended and in the S3, the power supply is generally in a reduced power mode and still consumes energy. When the computer is powered off and in the S5/off state, there is still a +5 volt standby voltage (+5VSB) applied to the motherboard for driving a basic power source control circuit of the computer system during the off state. However, this means the computer still consumes energy in the suspended state or even in the off state, thus, commercial power needs to be shut off to the computer, to save power, but users often forget to do this, resulting in wasting energy.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of examples and not by limitation. It should be noted that references to "an" or "one" embodiment in this disclosure are not necessarily to the same embodiment, and such references mean at least one.

Figure 1:
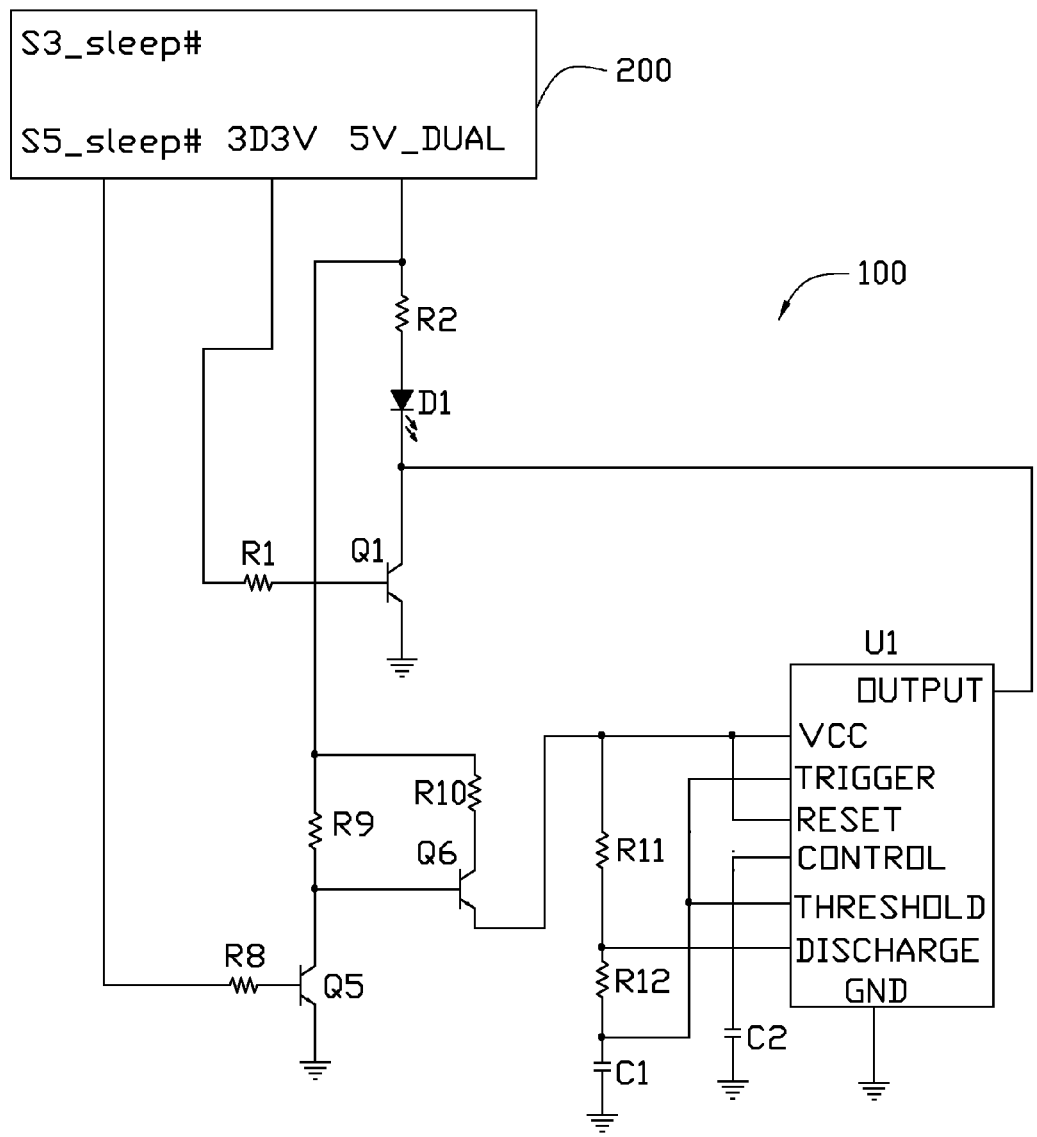
FIG. 1 and FIG. 2 are circuit diagrams of a power-saving reminder circuit for a computer in accordance with an exemplary embodiment of the present disclosure.
Figure 2:
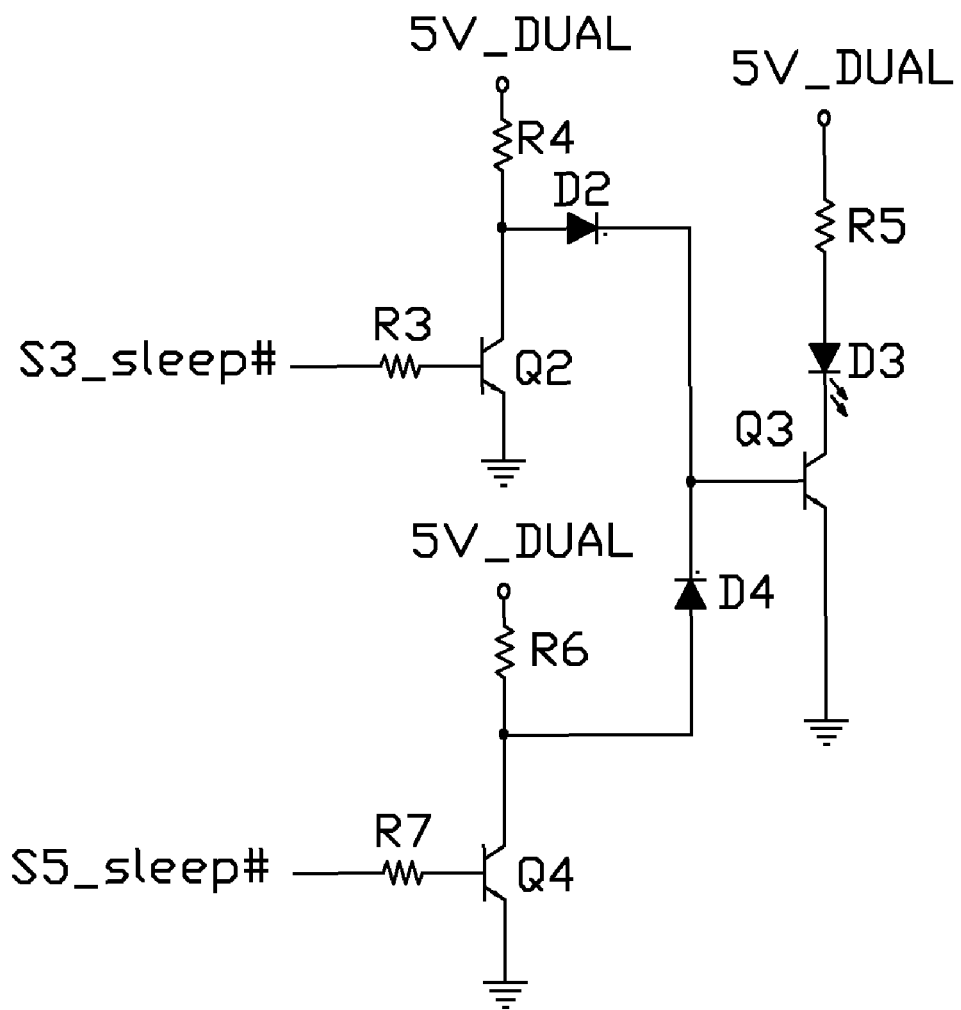

Referring to FIGS. 1 and 2, a power-saving reminder circuit 100 for a computer in accordance with an exemplary embodiment includes a counter chip U1, capacitors C1 and C2, resistors R1-R12, electronic switches, such as npn transistors Q1-Q6, two light emitting diodes (LEDs) D1 and D3, and two diodes D2 and D4. In one embodiment, the LEDs D1 and D3 are different colored LEDs, for example, the LED D1 is a green LED, and the LED D3 is a red LED.

A base of the transistor Q1 is connected to a 3.3 volt (V) power source 3D3V of a motherboard 200 of the computer through the resistor R1. An emitter of the transistor Q1 is grounded. A collector of the transistor Q1 is connected to a cathode of the LED D1 and also connected to an output pin OUTPUT of the counter chip U1. An anode of the LED D1 is connected to a 5V power source 5V_DUAL of the motherboard 200 through the resistor R2.

A base of the transistor Q2 is connected to a suspend signal pin S3_sleep# of the motherboard 200 through the resistor R3. An emitter of the transistor Q2 is grounded. A collector of the transistor Q2 is connected to the power source 5V_DUAL through the resistor R4 and also connected to an anode of the diode D2. A cathode of the diode D2 is connected to a cathode of the diode D4 and also connected to a base of the transistor Q3. An emitter of the transistor Q3 is grounded. A collector of the transistor Q3 is connected to a cathode of the LED D3. An anode of the LED D3 is connected to the power source 5V_DUAL through the resistor R5. An anode of the diode D4 is connected to a collector of the transistor Q4 and also connected to the power source 5V_DUAL through the resistor R6. An emitter of the transistor Q4 is grounded. A base of the transistor Q4 is connected to a suspending signal pin S5_sleep# of the motherboard 200 through the resistor R7.

A base of the transistor Q5 is connected to the suspend signal pin S5_sleep# of the motherboard 200 through the resistor R8. An emitter of the transistor Q5 is grounded. A collector of the transistor Q5 is connected to a base of the transistor Q6 and also connected to the power source 5V_DUAL through the resistor R9. A collector of the transistor Q6 is connected to the power source 5V_DUAL through the resistor R10. An emitter of the transistor Q6 is grounded through the resistors R11 and R12 and the capacitor C1 connected in series, and connected to the voltage pin VCC of the counter chip U1. A reset pin RESET of the counter chip U1 is connected to the voltage pin VCC of the counter chip U1. A trigger pin TRIGGER and a gate pin THRESHOLD of the counter chip U1 are connected to a node between the resistor R12 and the capacitor C1. A discharge pin DISCHARGE of the counter chip U1 is connected to a node between the resistors R11 and R12. A control pin CONTROL of the counter chip U1 is grounded through the capacitor C2. A ground pin GND of the counter chip U1 is grounded. In one embodiment, the counter chip U1 is an NE555 counter chip.

In use, when the motherboard 200 is powered on and in the S0/working state, the base of the transistor Q1 receives a high level signal from the 3.3V power source 3D3V of the motherboard 200, and the transistor Q1 is turned on. The LED D1 is lit, to indicate the motherboard 200 operates normally. The base of the transistor Q2 receives a high level signal from the suspend signal pin S3_sleep# of the motherboard 200, and the transistor Q2 is turned on. The collector of the transistor Q2 is at a low voltage level. The diode D2 is turned off, and the transistor Q3 is turned off. The LED D3 does not light. The base of the transistor Q5 receives a high level signal from the suspend signal pin S5_sleep# of the motherboard 200, and the transistor Q5 is turned on. The collector of the transistor Q5 is at a low voltage level. The base of the transistor Q6 receives the low level signal from the collector of the transistor Q5, and the transistor Q6 is turned off. The voltage pin VCC of the counter chip U1 does not receive a voltage, thus, the counter chip U1 does not operate. Therefore, the LED D1 is always lit when the motherboard 200 is in the S0/working state.

When the motherboard 200 is in the S3 state, the 3.3V power source 3D3V does not output the 3.3V voltage, the base of the transistor Q1 does not receive a voltage, and the transistor Q1 is turned off. The LED D1 does not light. The base of the transistor Q2 receives a low level signal from the suspend signal pin S3_sleep# of the motherboard 200, and the transistor Q2 is turned off. The diode D2 is turned on, and the base of the transistor Q3 receives a high level signal from the power source 5V_DUAL, and the transistor Q3 is turned on. The LED D3 is lit, to indicate the motherboard 200 is in a suspended state. The base of the transistor Q4 receives a high level signal from the suspend signal pin S5_sleep#, and the transistor Q4 is turned on. The collector of the transistor Q4 is at a low voltage level. The diode D4 is turned off. The base of the transistor Q5 receives a high level signal from the suspend signal pin S5_sleep# of the motherboard 200, and the transistor Q5 is turned on. The collector of the transistor Q5 is at a low voltage level. The base of the transistor Q6 receives the low level signal from the collector of the transistor Q5, and the transistor Q6 is turned off. The voltage pin VCC of the counter chip U1 does not receive a voltage, thus, the counter chip U1 does not operate. Therefore, the LED D3 is lit when the motherboard 200 is in the S3 state, to remind users, if needed, to shut off commercial power to the computer to save power.

When the motherboard 200 is powered off and in the S5/off state, the 3.3V power source 3D3V does not output the 3.3V voltage, the base of the transistor Q1 does not receive a voltage, and the transistor Q1 is turned off. The LED D1 does not light. The base of the transistor Q2 receives a high level signal from the suspend signal pin S3_sleep# of the motherboard 200, and the transistor Q2 is turned on. The collector of the transistor Q2 is at a low voltage level. The diode D2 is turned off, and the transistor Q3 is turned off. The LED D3 does not light. The base of the transistor Q5 receives a low level signal from the suspend signal pin S5_sleep# of the motherboard 200, and the transistor Q5 is turned off. The base of the transistor Q6 receives a high level signal from the 5V power source 5V_DUAL, and the transistor Q6 is turned on. The voltage pin VCC of the counter chip U1 receives a voltage and the counter chip U1 is powered on. At the same time, the capacitor C1 is charged through the resistors R11 and R12. When a voltage of the capacitor C1 reaches ⅔ of the voltage of the voltage pin VCC of the counter chip U1, the output pin OUTPUT of the counter chip U1 outputs a low level signal. The LED D1 is lit. At the same time, the discharge pin DISCHARGE of the counter chip U1 is turned on, and the capacitor C1 discharges through the resistor R12. When the voltage of the capacitor C1 is reduced to ⅓ of the counter chip U1, the output pin OUTPUT of the counter chip U1 outputs a high level signal. The LED D1 does not light. And after, the capacitor C1 is charged and discharged again, the theory is same as above. Therefore, the LED D1 blinks when the motherboard 200 is in the S5/off state, to remind users to shut off commercial power to the computer to save power.

In some embodiments, the on and off frequency and time to start of the LED D1 can be changed through changing values of the resistors R11 and R12 and the capacitor C1.

The power-saving reminder circuit 100 can indicate that the motherboard 200 operates normally through the LED D1 being always lit, it can also remind users to shut off commercial power through the lighting of the LED D3 when the computer is suspended and in the S3 state, to save power, and remind users to shut off commercial power through the blinking of the LED D1 when the computer is powered off and in the S5/off state, to save power.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A power-saving reminder circuit for a computer with a motherboard, the power-saving reminder circuit comprising:
    a first light emitting diode (LED) comprising a cathode, and an anode connected to a first power source of the motherboard;
    a second light emitting diode (LED) comprising a cathode, and an anode connected to the first power source;
    a counter chip comprising an output pin, a voltage pin, a reset pin, a trigger pin, a gate pin, and a discharge pin;
    a first electronic switch comprising first to third terminals, wherein the first terminal is connected to a second power source of the motherboard, the third terminal is grounded, the second terminal is connected to the cathode of the first LED and also connected to the output pin of the counter chip;
    a second electronic switch comprising first to third terminals, wherein the first terminal of the second electronic switch is connected to a first suspend signal pin of the motherboard, the third terminal of the second electronic switch is grounded, the second terminal of the second electronic switch is connected to the first power source of the motherboard through a first resistor;
    a third electronic switch comprising first to third terminals, wherein the first terminal of the third electronic switch is connected to the second terminal of the second electronic switch, the second terminal of the third electronic switch is connected to the cathode of the second LED, the third terminal of the third electronic switch is grounded;
    a fourth electronic switch comprising first to third terminals, wherein the first terminal of the fourth electronic switch is connected to a second suspend signal pin of the motherboard, the third terminal of the fourth electronic switch is grounded, the second terminal of the fourth electronic switch is connected to the first power source of the motherboard through a second resistor; and
    a fifth electronic switch comprising first to third terminals, wherein the first terminal of the fifth electronic switch is connected to the second terminal of the fourth electronic switch, the second terminal of the fifth electronic switch is connected to the first power source of the motherboard, the third terminal of the fifth electronic switch is grounded through a third resistor, a fourth resistor, and a first capacitor connected in series, and also connected to the voltage pin of the counter chip, the reset pin of the counter chip is connected to the voltage pin of the counter chip, the trigger pin and the gate pin of the counter chip are connected to a node between the fourth resistor and the first capacitor, the discharge pin of the counter chip is connected to a node between the third and the fourth resistors;
    wherein when the motherboard is powered on, the first electronic switch, the second electronic switch, and the fourth electronic switch are turned on, the third and the fifth electronic switches are turned off, the first LED is lit, the second LED is not lit, the counter chip does not operate;

wherein when the motherboard is in a suspended state, the first electronic switch, the second electronic switch, and the fifth electronic switch are turned off, the third and the fourth electronic switches are turned on, the first LED is not lit, the second LED is lit, the counter chip does not operate; and wherein when the motherboard is powered off, the second and the fifth electronic switches are turned on, the first electronic switch, the third electronic switch, and the fourth electronic switch are turned off, the first and the second LEDs are not lit, the first capacitor charges and discharges to make the counter chip control the first LED to blink.

2. The power-saving reminder circuit of claim 1, further comprising a sixth electronic switch and a first diode, wherein the sixth electronic switch comprises first to third terminals, the first terminal of the sixth electronic switch is connected to the second suspend signal pin of the motherboard, the third terminal of the sixth electronic switch is grounded, the second terminal of the sixth electronic switch is connected to the first power source and also connected to an anode of the first diode, a cathode of the first diode is connected to the first terminal of the third electronic switch.

3. The power-saving reminder circuit of claim 2, further comprising a second diode, an anode of the second diode is connected to the second terminal of the second electronic switch, a cathode of the second diode is connected to the first terminal of the third electronic switch.

4. The power-saving reminder circuit of claim 2, wherein the first to sixth electronic switches are npn transistors, the first to third terminals of the first to sixth electronic switches corresponds to bases, collectors, and emitters of the transistors, respectively.

5. The power-saving reminder circuit of claim 1, further comprising fifth to twelfth resistors, wherein the fifth resistor is connected between the first terminal of the first electronic switch and the second power source, the sixth resistor is connected between the anode of the first LED and the first power source, the seventh resistor is connected between the first terminal of the second electronic switch and the first suspend signal pin of the motherboard, the eighth resistor is connected between the anode of the second LED and the first power source, the ninth resistor is connected between the first terminal of the sixth electronic switch and the second suspend signal of the motherboard, the tenth resistor is connected between the second terminal of the sixth electronic switch and the first power source, the eleventh resistor is connected between the first terminal of the fourth electronic switch and the second suspend signal of the motherboard, the twelfth resistor is connected between the second terminal of the fifth electronic switch and the first power source.

6. The power-saving reminder circuit of claim 1, further comprising a second capacitor, the second capacitor is connected between a control pin of the counter chip and ground.

7. The power-saving reminder circuit of claim 1, wherein the counter chip is an NE555 counter chip.

8. The power-saving reminder circuit of claim 1, wherein the first power source is a 5 volt power source.

9. The power-saving reminder circuit of claim 1, wherein the second power source is a 3.3 volt power source.

10. The power-saving reminder circuit of claim 1, wherein the first LED is a green LED, and the second LED is a red LED.

* * * * *